United States Patent [19]

Nishio et al.

[11] Patent Number: 5,449,564
[45] Date of Patent: Sep. 12, 1995

[54] ORGANIC ELECTROLUMINESCENT ELEMENT HAVING IMPROVED DURABILITY

[75] Inventors: Yoshitaka Nishio; Takeshi Sano; Masayuki Fujita; Takanori Fujii; Yuji Hamada; Kenichi Shibata, all of Osaka, Japan

[73] Assignee: Sanyo Electric Co., Ltd., Osaka, Japan

[21] Appl. No.: 142,970

[22] Filed: Oct. 29, 1993

[30] Foreign Application Priority Data

Oct. 29, 1992 [JP] Japan .................. 4-291357
Oct. 29, 1992 [JP] Japan .................. 4-291358

[51] Int. Cl.⁶ .......................................... H05B 33/14
[52] U.S. Cl. ..................................... 428/690; 428/691; 428/917; 313/503; 313/504; 313/506
[58] Field of Search ............... 428/690, 691, 917; 313/503, 504, 506

[56] References Cited

FOREIGN PATENT DOCUMENTS 3-222793  9/1991  Japan .
3-222794  9/1991  Japan .

Primary Examiner—Charles R. Nold
Attorney, Agent, or Firm—Merchant, Gould, Smith, Edell, Welter & Schmidt

[57] ABSTRACT

There is disclosed an EL element having at least one layer made from an organic material between an electron injection electrode and a hole injection electrode. The organic material consists of an oxadiazole series compound which has a plurality of oxadiazole rings, each of the oxadiazole rings being substituted by a condensed polycyclic aromatic group.

28 Claims, 4 Drawing Sheets

ORGANIC ELECTROLUMINESCENT ELEMENT HAVING IMPROVED DURABILITY

BACKGROUND OF THE INVENTION

1. Field of the Invention

This invention relates to an organic electroluminescent element having improved durability and especially to materials for an organic luminous layer and an organic electron transport layer, which are components of the organic EL element.

2. Related Arts

Recently, in accordance with diversification of information apparatuses, the demand has been growing for flat-type display elements which can manage with less electric power and smaller space than cathode-ray tubes (CRT). Included in such flat-type display elements are crystalline liquid display elements and plasma display elements, and drawing special attention among them is an electroluminescent (hereinafter referred to as EL) element, which is a self-luminescent type and can provide clear display.

Among such EL elements, an organic EL element has an advantage of capable of being driven with low voltage because it is a charge injected from an electrode and recombined in an organic luminous material, thereby exhibiting luminescence. It has another advantage of capable of obtaining theoretically any desired luminous colors by modifying molecular structure of the organic luminous material for an organic luminous layer.

Meanwhile, selection of organic materials for the organic EL element greatly affects its characteristics, and especially its durability, whose improvement is a crucial subject at present. Unfortunately, most of the organic materials which are being used for an organic luminous layer and an organic electron transport layer are insufficient in their film-forming properties, thereby deteriorating the durability of the EL element. Thus, organic materials having satisfactory film-forming properties not to damage the durability of the EL element are very limited.

The present application is an improvement of Japanese Patent Application NO. 3-222793, which proposes luminous layer materials and electron transport layer materials capable of improving the durability of EL elements by solving the above-mentioned problems.

SUMMARY OF THE INVENTION

An object of the present invention is to provide a useful EL element which has excellent durability and can retain stable luminance for a long period of time.

This object can be achieved by an organic EL element comprising an electron injection electrode, a hole injection electrode, and at least one layer made from an organic material between the electron injection electrode and the hole injection electrode. The organic material comprises an oxadiazole series compound having a plurality of oxadiazole rings, each of the oxadiazole rings being substituted by a condensed polycyclic aromatic group.

When at least two layers made from organic materials are present, the layers may include an organic luminous layer and at least one carrier transport layer.

The organic luminous layer may comprise the oxadiazole series compound.

The condensed polycyclic aromatic group may have two or three benzene rings and the condensed polycyclic aromatic group may be either anthracene or phenanthrene.

The condensed polycyclic aromatic group may have four benzene rings and be pyrene.

The oxadiazole series compound may have a benzene ring between the oxadiazole rings substituted by the condensed polycyclic aromatic group, the benzene ring being combined with carbon, the carbon being not combined with the condensed polycyclic aromatic group.

The oxadiazole series compound may have an alkyl chain between the oxadiazole rings substituted by the condensed polycyclic aromatic group, the alkyl chain being combined with carbon, the carbon being not combined with the condensed polycyclic aromatic group.

The oxadiazole series compound may be selected from the group consisting of chemical formulas 101–104 shown below:

[chemical formula 101]

[chemical formula 102]

[chemical formula 103]

[chemical formula 104]

The carrier transport layer may be an organic hole transport layer.

The organic hole transport layer may comprise a diamine derivative.

The diamine derivative may be a compound shown in chemical formula 105 below:

[chemical formula 105]

When at least two carrier transport layers are present, the carrier transport layers may include an organic electron transport layer or include an organic hole transport layer and an organic electron transport layer.

The at least one carrier transport layer may include at least an organic electron transport layer, the organic electron transport layer comprising the oxadiazole series compound.

The condensed polycyclic aromatic group may have two or three benzene rings and be either anthracene or phenanthrene.

The condensed polycyclic aromatic group may have four benzene rings and be pyrene.

The oxadiazole series compound may have a benzene ring between the oxadiazole rings substituted by the condensed polycyclic aromatic group, the benzene ring being combined with carbon, the carbon being not combined with the condensed polycyclic aromatic group.

The oxadiazole series compound may have an alkyl chain between the oxadiazole rings substituted by the condensed polycyclic aromatic group, the alkyl chain being combined with carbon, the carbon being not combined with the condensed polycyclic aromatic group.

The oxadiazole series compound may be selected from the group consisting of chemical formulas 106-108 shown below:

[chemical formula 106]

[chemical formula 107]

[chemical formula 108]

[chemical formula 109]

When at least two carrier transport layers are present, the carrier transport layers may include an organic electron transport layer and an organic hole transport layer.

The organic hole transport layer may comprise a diamine derivative and the organic luminous layer may comprise a perylene derivative.

The diamine derivative may be a compound shown in chemical formula 110 below and the perylene derivative is a compound shown in chemical formula 111:

[chemical formula 110]

[chemical formula 111]

Another object of the present invention is to provide an organic luminous material for an EL element, the material having excellent film-forming properties and being able exhibit luminous colors other than blue.

What causes crystallization of compounds which are formed into films is orderly arrangement of the molecules of the compounds. The oxadiazole series compounds used for the EL element of this invention, however, have a voluminous condensed polycyclic aromatic group in their molecules. Accordingly, this voluminous condensed polycyclic aromatic group can favorably prevent the molecules from arraying regularly, thereby restricting crystallization of the oxadiazole series compounds after being formed into films. Therefore, using these oxadiazole series compounds for an electron transport layer or an luminous layer can realize an EL element having stable luminance for a long period of time.

In addition, the oxadiazole series compounds used for the EL element of this invention has another advantage of having broad $\pi$ electron conjugated system thanks to its condensed polycyclic aromatic group, which stabilizes electron. As a result, their luminous wavelengths become longer than the oxadiazole compounds disclosed in Japanese Patent Application No. 3-222793, so that their luminous colors can be diversified.

The oxadizole series compounds according to this invention are generally synthesized as follows:

then,

(1.8-Diazabicyclo[5.4.0]7-undecene)

-continued

BRIEF DESCRIPTION OF THE DRAWINGS

These and other objects advantages and features of the invention will become apparent from the following description thereof taken in conjunction on with the accompanying drawings which illustrate a specific embodiment of the invention. In the drawings.

PREFERRED EMBODIMENTS

<Embodiment 1 (luminous layer)>

(Example 1)

Figure 1:
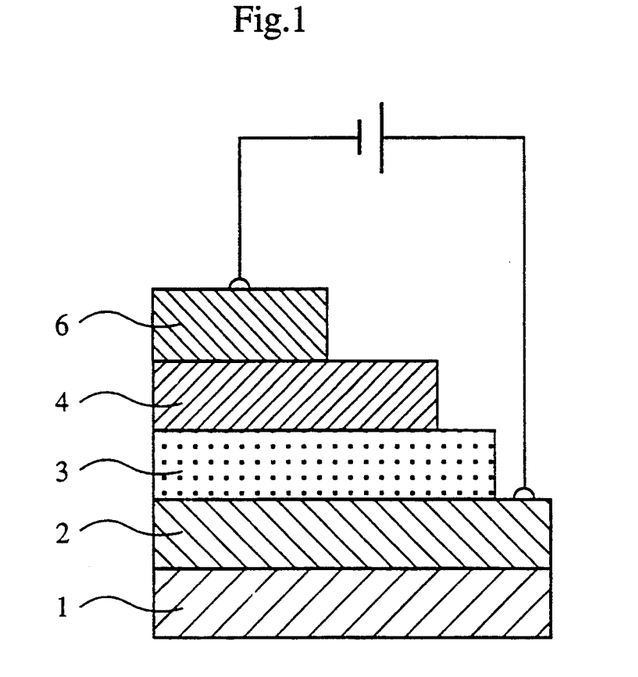
FIG. 1 is a sectional view of an organic EL element according to a first embodiment of the present invention.

FIG. 1 shows a sectional view of an organic EL element of this embodiment. A hole injection electrode 2 is formed on a glass substrate 1, an organic hole transport layer 3 is formed thereon, an organic luminous layer 4 is further provided thereon and finally an electron injection electrode 6 is formed thereon.

The hole injection electrode 2 comprises an oxide of In and Sn (ITO). The organic hole transport layer 3 comprises the diamine derivative (TPD) expressed by the chemical formula 1 below. The organic luminous layer 4 comprises the oxadiazole series compound expressed by the chemical formula 2 below. The electron injection electrode comprises a Mg-In alloy.

[chemical formula 1]

[chemical formula 2]

The EL element having the above-mentioned construction was produced as follows:

First, the glass substrate 1 having the hole injection electrode 2 made of In—Sn oxides (ITO) thereon was cleaned with neutral detergent and water, and ultrasonically cleaned in acetone for 20 minutes and further in isopropyl alcohol for about 20 minutes. Then, the organic hole transport layer 3 was formed onto the hole injection electrode 2 by vacuum evaporating diamine derivative (TPD) shown in the chemical formula 1, and further the organic Luminous layer 4 was formed onto the organic hole transport layer 3 by evaporating the oxadiazole series compound expressed by the chemical formula 2. Finally, the electron injection electrode 6 was formed by vacuum evaporating Mg and In together in a ratio of 10:1, thereby producing an organic EL element.

The above evaporations were all conducted under the conditions of $1 \times 10^6$ Torr of vacuum, 20° C. for the substrate temperature and 2 Å/sec as the evaporating speed for the organic layers.

The above-mentioned oxadiazole series compound was prepared as follows:

First, as shown in the chemical formula 3 below, ethyl ester was synthesized from a commercially avail- able condensed polycyclic aromatic compound having a carboxyl group, according to the method of C. Gundu Rao et. al. (organic preparations and procedures INT. 12(3-4), P.225-228 (1980)).

[chemical formula 3]

Then, the ethyl ester thus Obtained was synthesized as shown in chemical formula 4 below, according to the method of Hamada et. al. (The journal of chemical society of Japan, 1991, (11), P.1540-1548).

[chemical formula 4]

The EL element thus produced is hereinafter referred to as the $(a_1)$ element.

(Examples 2–4)

The EL elements of Examples 2–4 were produced in the same manner as Example 1 except that the oxadiazole series compounds shown in the chemical formulas 5–7 below were used for the organic luminous layer 4 in place of the oxadiazole series compound shown in chemical formula 2.

[chemical formula 5]

[chemical formula 6]

[chemical formula 7]

These oxadiazole series compounds were prepared in the same manner as in Example 1.

The EL elements thus produced are hereinafter referred to as the elements ($a_2$)–($a_4$) respectively.

(Comparative Example)

The EL elements of this comparative example were produced in the same manner as Example 1 except that the oxadiazole series compounds shown in the chemical formulas 8 and 9 below were used for the organic luminous layer 4 in place of the oxadiazole series compound shown in the chemical formula 2.

[chemical formula 8]

[chemical formula 9]

These oxadiazole series compounds were prepared in the same manner as in Example 1.

The EL elements thus produced are hereinafter referred to as the elements $(x_1)$–$(x_2)$ respectively.

(Experiment 1)

Luminous colors, durability, maximum luminance of each of the elements $(a_1)$–$(a_4)$ and $(x_1)$ and $(x_2)$ were measured by applying a positive direct voltage to the hole injection electrode 2 and a negative direct voltage to the electron injection electrode 6. The results are shown in Table 1 below.

[TABLE 1]

| elements | voltage (V) | current density (mA/cm$^2$) | peak wave length (nm) | luminous colors | durability (day) | maximum luminance (cd/m$^2$) |
|---|---|---|---|---|---|---|
| $a_1$ | 16 | 140 | 575 | yellow | 6.5 | 800 |
| $a_2$ | 16 | 135 | 535 | green | 4.5 | 780 |
| $a_3$ | 18 | 160 | 585 | yellow | 5.5 | 720 |
| $a_4$ | 18 | 195 | 600 | orange | 6.5 | 450 |
| $x_1$ | 17 | 63 | 465 | blue | 2.5 | 600 |
| $x_2$ | 21 | 130 | 485 | blue | 2.5 | 750 |

As apparent from Table 1 above, it was confirmed that the elements $(a_1)$–$(a_4)$ of this invention had excellent luminous durability, compared with those of Comparative Example. This seems to result from that their durabilities were improved in accordance with improvement of their film-forming properties.

Furthermore, various colors besides blue: green, yellow, or orange were obtained from the elements $(a_1)$–$(a_4)$ of this invention.

The following experiment was conducted to examine the improvement of the film-forming properties.

(Experiment 2)

Figure 2:
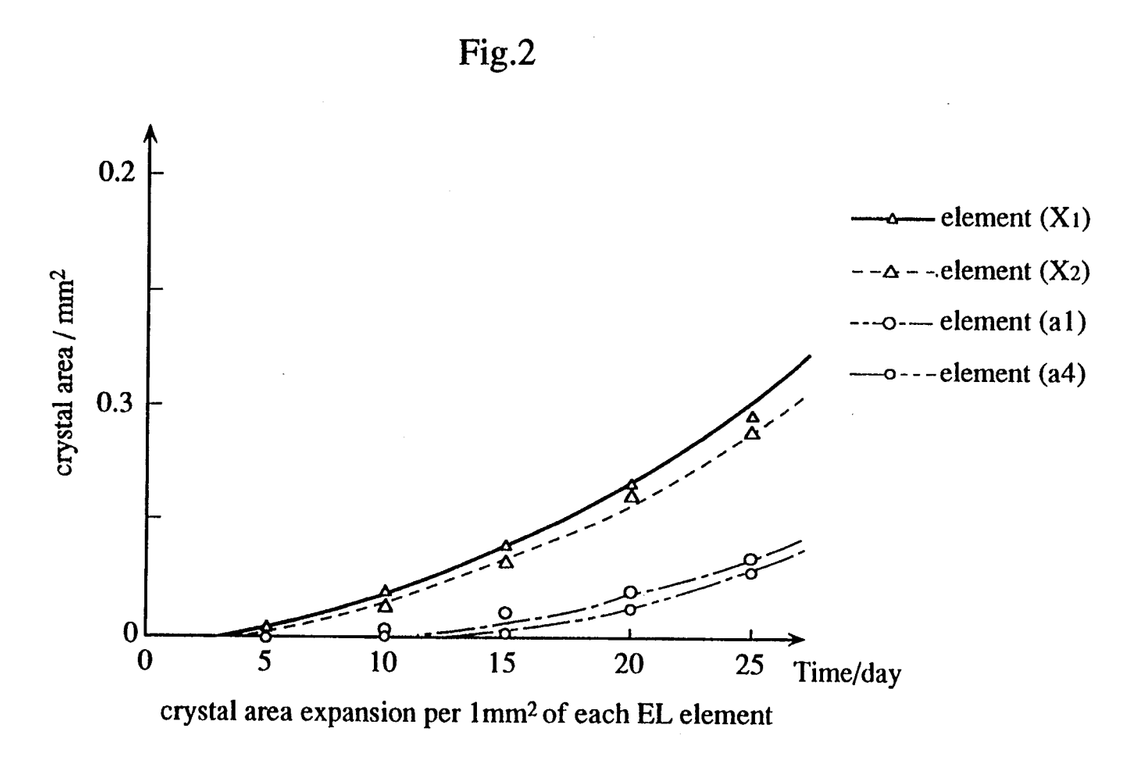
FIG. 2 is a graph showing crystal area expansion with time per 1 mm² of each of the EL elements ($a_1$) and ($a_4$) of this invention and ($x_1$) and ($x_2$) of Comparative Example.

In order to examine film-forming properties of each of the EL elements $(a_1)$–$(a_4)$, $(x_1)$ and $(x_2)$, crystal area expansion with time per 1 mm$^2$ of each EL element was measured by leaving the EL elements without using at all after being produced. The results are shown in the graph of FIG. 2.

As apparent from the graph, in the EL elements $(a_1)$–$(a_4)$ of this invention, crystal developed about half or one third as broad as in the EL elements $(x_1)$ and $(x_2)$ of Comparative Example. In addition, the development of the crystal was slower in the former case, which proves good film-forming properties of the EL elements of this invention. This well coincides with the results of Experiment 1 above.

<Embodiment 2 (electron transport layer)>

(Example 1)

Figure 3:
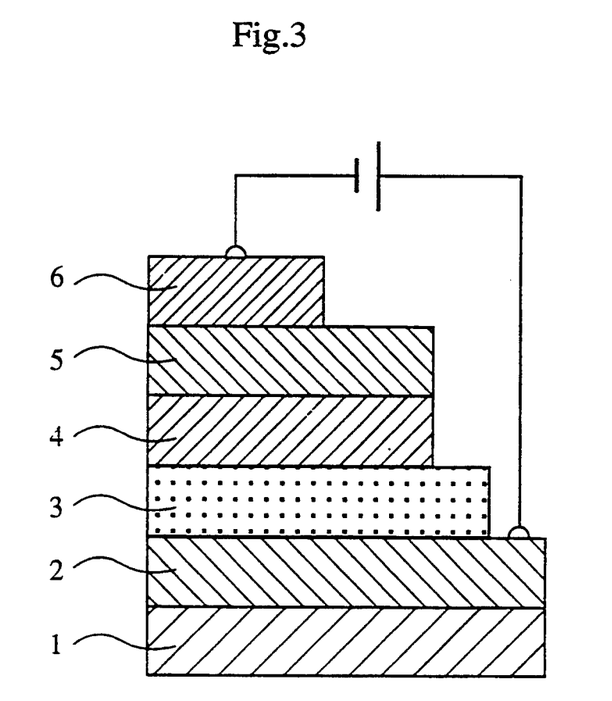
FIG. 3 is a sectional view of an organic EL element according to a second embodiment of the present invention.

FIG. 3 shows a sectional view of an organic EL element of this embodiment. The EL element of this example has the same construction as that of Example 1 in Embodiment 1 except that an organic electron transport layer 5, which comprises the oxadiazole series compound shown in the chemical formula 11, was additionally provided between the organic luminous layer 4 and the electron injection electrode 6.

The EL element thus constructed was produced in the same manner as Example 1 of Embodiment 1 except that the perylene derivative shown in the chemical formula 10 was used for the organic luminous layer 4 in place of the oxadiazole series compound shown in chemical formula 2.

[chemical formula 10]

[chemical formula 11]

The oxadiazole series compound shown in the chemical formula 11 was prepared in the same manner as in Example 1 of Embodiment 1.

The EL element thus produced is hereinafter referred to as the element (b₁).

(Examples 2–4)

The EL elements of Examples 2–4 were produced in the same manner as Example 1 of this embodiment except that the oxadiazole series compounds shown in the chemical formulas 12–14 below were used for the organic electron transport layer 5 in place of the oxadiazole series compound shown in chemical formula 11.

These oxadiazole series compounds were prepared in the same manner as in Example 1 of this embodiment.

The EL elements thus produced are hereinafter referred to as the elements (b₂)–(b₄) respectively.

(Comparative Example)

The EL elements of this comparative example were produced in the same manner as Example 1 of this embodiment except that the oxadiazole series compounds shown in the chemical formulas 15 and 16 below were used for the organic electron transport layer 5 in place of the oxadiazole series compound shown in chemical formula 11.

[chemical formula 12]

[chemical formula 13]

[chemical formula 14]

formula 11.

[chemical formula 15]

[chemical formula 16]

These oxadiazole series compounds were prepared in the same manner as in Example 1 of this embodiment.

The EL elements thus produced are hereinafter referred to as the elements (y₁)–(y₂) respectively.

(Experiment 1)

Durability and maximum luminance of each of the EL elements (b₁)–(b₄) and (y₁) and (y₂) were measured by applying a positive direct voltage to the hole injection electrode 2 and a negative direct voltage to the electron injection electrode 6. The results are shown in Table 2 below.

[TABLE 2]

| elements | voltage (V) | current density (mA/cm$^2$) | durability (day) | maximum luminance (cd/m$^2$) |
| --- | --- | --- | --- | --- |
| b₁ | 17 | 145 | 7.0 | 120 |
| b₂ | 18 | 160 | 4.5 | 100 |
| b₃ | 17 | 145 | 6.0 | 130 |
| b₄ | 15 | 130 | 6.5 | 120 |
| y₁ | 17 | 105 | 2.5 | 110 |
| y₂ | 19 | 140 | 2.0 | 120 |

All the EL elements in Table 2 exhibited the luminous color of red with a peak wave length of 630 nm.

As apparent from the table, it was confirmed that the EL elements (b₁)–(b₄) of this invention had excellent durability, compared with (y₁) and (y₂) of Comparative Example. This seems to result from that the oxadiazole series compounds of this invention used for the organic electron transport layer 5 being not easily crystallized thanks to their excellent film-forming properties, which favorably prevents the EL elements from being damaged by the crystallization.

The following experiment was conducted to examine the improvement of the film-forming properties.

(Experiment 2)

Figure 4:
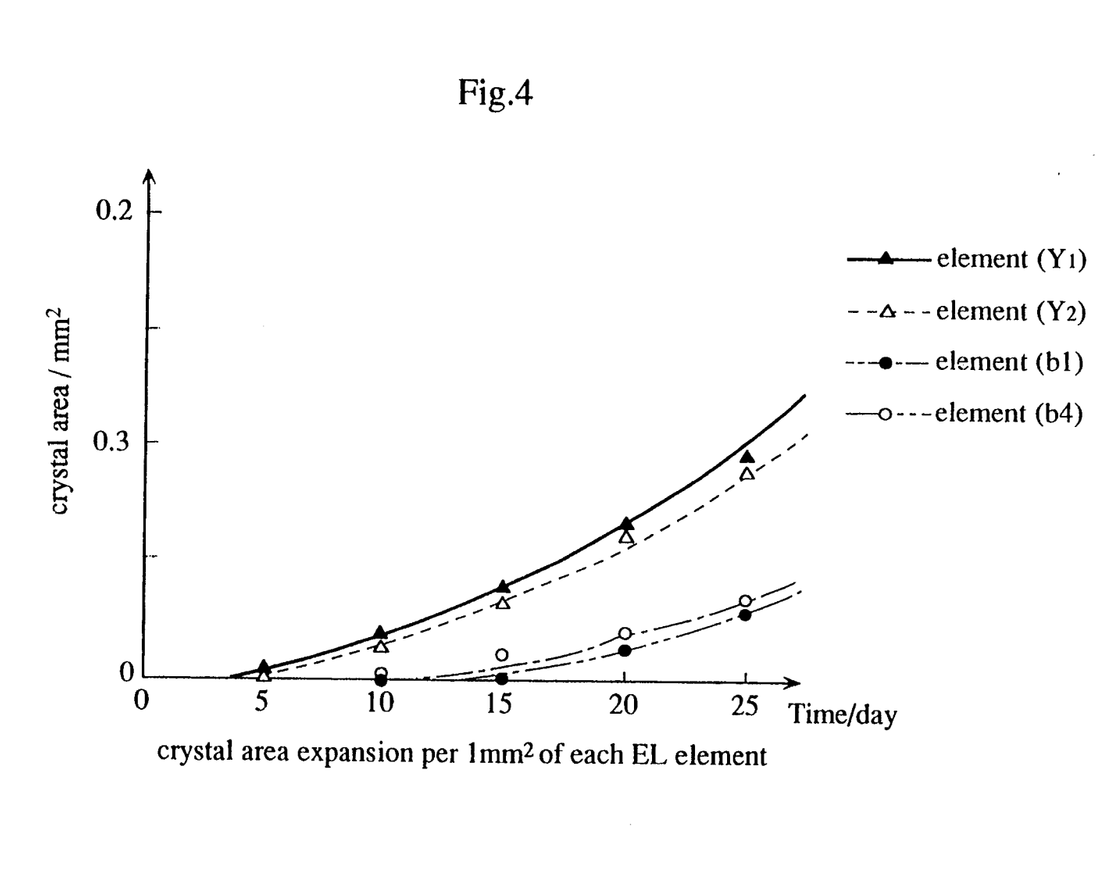
FIG. 4 is a graph showing crystal area expansion with time per 1 mm² of each of the EL elements ($b_1$) and ($b_2$) of this invention and ($y_1$) and ($y_2$) of Comparative Example.

In order to examine film-forming properties of each of the elements (b₁)–(b₄), (y₁) and (y₂), crystal area expansion with time per 1 mm² of each EL element was measured by leaving the EL elements without using at all after being produced. The results are shown in the graph of FIG. 4.

As apparent from the graph, in the EL elements (b₁)–(b₄) of this invention, crystal developed about half or one third as broad as in the elements (y₁) and (y₂) of Comparative Example. In addition, the development of the crystal was slower in the former case, which proves their good filmforming properties of the EL elements of this invention. This well coincides with the results of Experiment 1 above.

(Others)

Although the EL elements used in Embodiment 1 are formed with a two-layer structure, EL elements formed with a three-layer structure can be used to obtain the same results.

Although the EL elements used in Embodiment 2 are formed with a three-layer structure, EL elements formed with a two-layer structure can be used to obtain the same results as long as the two layer structure is a SH-B structure in which an organic luminous layer and an organic electron transport layer are provided between a hole injection electrode and an electron injection electrode.

Besides anthracene and phenanthrene mentioned in the above embodiments as members of a condensed polycyclic aromatic group included in the oxadiazole series compounds, phenanthrene or pyrene can be used instead. In addition, an oxadiazole series compound having an alkyl chain between a plurality of oxadiazole rings can be used instead.

Besides the ITO film used for the hole injection electrode 2 in the above embodiments, other films such as a gold translucent film can be used instead as long as they have a high work function and high transparency.

Besides the diamine derivative (TPD) shown in the chemical formula 1, other various diamine derivatives shown in (Y. Takeshita et. al., Report on Progress in Polymer Physics in Japan, vol. 30,503 (1987) or polyvinyl carbazole shown in (T. Fujii et al., J. PhotoPolymer Sci. and Tech., vol. 4,135 (1991)) can be used for the organic hole transport layer 3

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An organic EL element comprising an electron injection electrode, a hole injection electrode, and at least one layer made from an organic material between the electron injection electrode and the hole injection electrode, wherein said organic material comprises an oxadiazole series compound having a plurality of oxadiazole rings, each of the oxadiazole rings being substituted by a condensed polycyclic aromatic group.

2. The organic EL element of claim 1, wherein at least two layers mad from organic materials are present, wherein said layers include an organic luminous layer and at least one carrier transport layer.

3. The organic EL element of claim 2, wherein said organic luminous layer comprises said oxadiazole series compound.

4. The organic EL element of claim 3, wherein said condensed polycyclic aromatic group has two benzene rings.

5. The organic EL element of claim 3, wherein said condensed polycyclic aromatic group has three benzene rings.

6. The organic EL element of claim 5, wherein said condensed polycyclic aromatic group is one of anthracene and phenanthrene.

7. The organic EL element of claim 3, wherein said condensed polycyclic aromatic group has four benzene rings.

8. The organic EL element of claim 7, wherein said condensed polycyclic aromatic group is pyrene.

9. The organic EL element of claim 3, wherein said oxadiazole series compound has a benzene ring between the oxadiazole rings substituted by said condensed polycyclic aromatic group, the benzene ring being combined with carbon, the carbon being not combined with said condensed polycyclic aromatic group.

10. The organic EL element of claim 3, wherein said oxadiazole series compound has an alkyl chain between the oxadiazole rings substituted by said condensed polycyclic aromatic group, the alkyl chain being combined with carbon, the carbon being not combined with said condensed polycyclic aromatic group.

11. The organic EL element of claim 9, wherein said oxadiazole series compound is selected from the group consisting of chemical formulas 101-104 shown below:

[chemical formula 101]

[chemical formula 102]

[chemical formula 103]

[chemical formula 104]

12. The organic EL element of claim 3, wherein said carrier transport layer is an organic hole transport layer.

13. The organic EL element of claim 12, wherein the organic hole transport layer comprises a diamine derivative.

14. The organic EL element of claim 13, wherein the diamine derivative is a compound shown in chemical formula 105 below:

[chemical formula 105]

15. The organic EL element of claim 3, wherein at least two carrier transport layers are present, wherein said carrier transport layers include an organic electron transport layer.

16. The organic EL element of claim 3, wherein at least two carrier transport layers are present, wherein said carrier transport layers include an organic hole transport layer and an organic electron transport layer.

17. The organic EL element of claim 2, wherein said at least one carrier transport layer includes at least an organic electron transport layer, said organic electron transport layer comprising said oxadiazole series compound.

18. The organic EL element of claim 17, wherein said condensed polycyclic aromatic group has two benzene rings.

19. The organic EL element of claim 17, wherein said condensed polycyclic aromatic group has three benzene rings.

20. The organic EL element of claim 19, wherein said condensed polycyclic aromatic group is one of anthracene and phenanthrene.

21. The organic EL element of claim 17, wherein said condensed polycyclic aromatic group has four benzene rings.

22. The organic EL element of claim 21, wherein said condensed polycyclic aromatic group is pyrene.

23. The organic EL element of claim 17, wherein said oxadiazole series compound has a benzene ring between the oxadiazole rings substituted by said condensed polycyclic aromatic group, the benzene ring being combined with carbon, the carbon being not combined with said condensed polycyclic aromatic group.

24. The organic EL element of claim 17, wherein said oxadiazole series compound has an alkyl chain between the oxadiazole rings substituted by said condensed polycyclic aromatic group, the alkyl chain being combined with carbon, the carbon being not combined with said condensed polycyclic aromatic group.

25. The organic EL element o f claim 23, wherein said oxadiazole series compound is selected from the group consisting of chemical formulas 106–108 shown below:

[chemical formula 106]

[chemical formula 107]

[chemical formula 108]

[chemical formula 109]

26. The organic EL element of claim 17, wherein at least two carrier transport layers are present, wherein said carrier transport layers include the organic electron transport layer and an organic hole transport layer.

27. The organic EL element of claim 26, wherein said organic hole transport layer comprises a diamine derivative and said organic luminous layer comprises a perylene derivative.

28. The organic EL element of claim 27, wherein the diamine derivative is a compound shown in chemical formula 110 below and the perylene derivative is a compound shown in chemical formula 111:

[chemical formula 110]

[chemical formula 111]